US008402822B2

(12) United States Patent
Hopper (10) Patent No.: US 8,402,822 B2
(45) Date of Patent: Mar. 26, 2013

(54) PROCESS TANKS IN COMBINATION WITH A FLOAT MAGNETOSTRICTIVE LEVEL DETECTOR

(75) Inventor: Henry Hopper, Baton Rouge, LA (US)

(73) Assignee: ABB Inc., Cary, NC (US)

(*) Notice: Subject to any disclaimer, the term of this patent is extended or adjusted under 35 U.S.C. 154(b) by 604 days.

(21) Appl. No.: 12/501,976

(22) Filed: Jul. 13, 2009

(65) Prior Publication Data

US 2011/0005312 A1 Jan. 13, 2011

(51) Int. Cl.
*G01F 23/00* (2006.01)
(52) U.S. Cl. .......................................... 73/313
(58) Field of Classification Search .................... None
See application file for complete search history.

(56) References Cited

U.S. PATENT DOCUMENTS

| 4,468,975 | A | * | 9/1984 | Sayles et al. | 73/863.81 |
| 4,694,599 | A | * | 9/1987 | Hart et al. | 40/449 |
| 5,076,100 | A | * | 12/1991 | Hunter et al. | 73/290 V |
| 5,986,449 | A | * | 11/1999 | Koski | 324/207.13 |
| 5,998,991 | A | | 12/1999 | Begin | |
| 7,454,969 | B2 | * | 11/2008 | Hart | 73/306 |
| 2008/0098809 | A1 | * | 5/2008 | Skinner | 73/290 R |
| 2008/0099414 | A1 | * | 5/2008 | Haslem | 210/800 |

OTHER PUBLICATIONS

US as International Search Authority, Search Report and Written Opinion, dated Sep. 1, 2010, for PCT/US2010/041812.

* cited by examiner

*Primary Examiner* — Hezron E Williams
*Assistant Examiner* — Mark A Shabman
(74) *Attorney, Agent, or Firm* — Jones Walker, LLP (57) ABSTRACT

The invention is a process tank containing a direct level magnetostrictive measurement system disposed directly in the tank, where the level system preferably communicates to a remote location. One embodiment of the invention embodies an internal well guide chamber, which exactly replicates the actual vessel's internal conditions (pressure and temperature), and also prevents the float from being affected by turbulence from a two phase condition, such as might occur if boiling or flashing is present inside the vessel. The process tank should have a fluid temperature different by more than 50° C. from the ambient environment, or alternatively, be a flashing tank.

15 Claims, 7 Drawing Sheets

SECTION A-A
TOP VIEW OF MAGNET
(WELD RING & END CAP NOT SHOWN)

FIGURE 7

PROCESS TANKS IN COMBINATION WITH A FLOAT MAGNETOSTRICTIVE LEVEL DETECTOR

BACKGROUND OF THE INVENTION

Field of Invention

Many industries utilized tanks to process or store liquids, and use level detectors to determine the fluid level within the tank. Level detectors are well known in the art and include magnetostrictive level detectors, float level detectors, guided wave radar level detectors, ultrasonic level detectors, float/magnet combination level detectors, and other similar devices.

One type of application where level detectors are used with unsatisfactory results is in process tanks designed for flashing of a fluid (boiling). For instance, high pressure steam boiler tanks, heat exchangers (such as a propylene heat exchangers) or cryogenic cooling applications present level detection problems because the fluid is boiling, making accurate detection of fluid levels difficult. Ultrasonic, guided wave and other direct detectors are generally unsuitable due to the turbulence at the vapor/liquid interface due to flashing. Additionally, the environment is harsh, commonly configured with high or low process temperatures, and high process pressures. For instance, a steam boiler or steam generator process application generally utilizes a gas or coal fired operation, generating steam within the process vessel or tank, that is subsequently fed to a generator. In steam generators or boilers, typical tank operating vapor pressures are over 200 psi, and more typically, about 500-2000 psi, with process temperatures in ranges of about 240-350° C.

To maximize process efficiencies, the process is designed for specific operating temperatures and pressures. Additionally, the liquid phase level of the process tank is designed to remain within a fairly narrow range. Failure to maintain liquid levels accurately can result in loss of efficiencies if too low, and possible harm to process equipment if too high. For instance, in a steam boiler application, if the liquid water level is too low, inefficiency occurs because of lower than designed exchange contact area, and if the water level is too high, liquid droplets with entrained impurities can carry over to the generating equipment, reducing turbine blade life.

Flashing process tanks (as used herein a "flashing process tank" is a tank designed to contain a boiling process condition, with both the liquid and gas phase of the process chemical present, at suitable pressure and temperature, are generally cylindrical vessels and can vary in vessel diameter and length. The flashing process tank contains both a gas and liquid phase of the flashed fluid, and the process may involve equipment located within the process tank. For instance, in a heat exchanger operation designed to operate at flashing conditions (a heat exchanger is a device in which energy is transferred from one fluid to another across a solid surface, such as across a pipe boundary) the process environment may include an outer "shell" tank containing a first liquid fluid, and disposed within the shell in the liquid layer can be a series of tubes carrying a second fluid to be cooled by the liquid in the shell. The shell fluid would be subject to flashing caused by the heat transferred from the materials flowing within the tubes. Depending on the fluids, flashing can occur at both high and low temperatures at the designed pressure regime.

Figure 1:
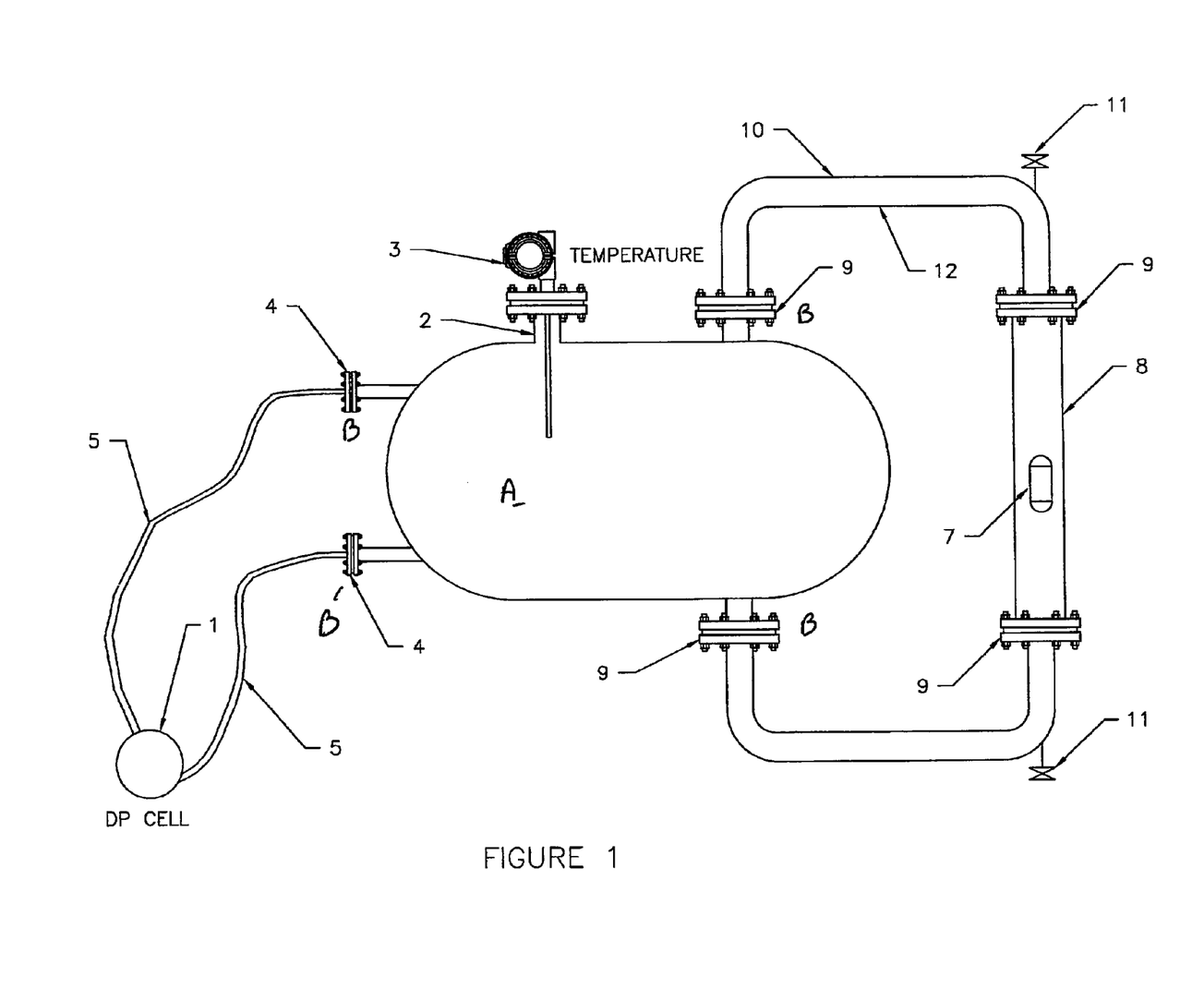
FIG. 1 is a depiction of a prior art pressure tank and level measuring system.

Prior art methods of detecting process level in process tanks, and in particular a flashing process tank will be discussed in the context of a high pressure steam boiler application. A prior art high pressure vessel steam boiler is depicted in FIG. 1. Shown is tank A, having a series of process connections B, each shown as a flange to which various systems are attached. Each flange B (hereafter, the "tank flange") is generally formed on a neck-like extension created in the tank. The tank flange surrounds an opening through the neck extension. Instrumentation, piping or other equipment can be mounted to this tank flange via a corresponding flange body (hereafter, the "instrument flange body") which is bolted to the tank flange, usually with a gasket or seal positioned between the tank and instrument flange body to sealingly join the instrument flange body to the tank flange. Not shown are process isolation valves which are typically utilized. As shown, the instrument flange body and equipment mounted on the instrument flange body are sealed from the tank interior to maintain internal tank pressures and temperatures present in a flashing environment.

The instrument flange body is removable from the joint with the tank flange. The instrument flange body will generally be a plate covering the tank opening having one or more openings ("instrument openings") of varying sizes to accommodate equipment that exits the tank through the neck opening and tank flange. Process connections can be other than a flanged joint, and can include pipe nipples extending above the tank having external or internal threads to which piping or other instrumentation may be sealingly connected.

Level in these type of tanks is indirectly measured by attempting to bring internal process conditions outside of the vessel. One level measurement system shown is a remote external chamber which can be fitted with various hardware including but not limited to a local level indicating device, allowing a user to visually confirm level within the tank. This is generally float based technology.

Also shown is one standard level detector utilized in a boiler tank, a differential pressure cell 1 (a "DP" cell). The differential pressure cell measures the differential pressure between the vapor pressure in the tank and the hydrostatic head of liquid pressure in the tank (measured near the bottom of the tank). Narrow diameter tubing 5 connects the DP cell 1 to a flanged joint on the tank A. The specific gravity of the fluid in the vessel changes with temperature, this change can be compensated by using a temperature probe generally disposed in the liquid phase of the fluid, and modifying the level based upon the measured temperature. Using the differential pressure, suitably adjusted for specific gravity changes due to temperature variations, the liquid level in the tank can be computed. The level detector system may be configured to communicate via a transmitter and send either the raw measured values or the temperature compensated level (or both) to a remote location, such as a control room.

As described, the DP cell system requires three flanged openings into the tank: two for the DP cell, and one of the temperature sensor. Each flanged joint presents leakage points at the two gasket surfaces. However, the differential pressure cell based system is inherently inaccurate. The vapor and liquid line leading to the DP cell may or may not be insulated. depending on ambient conditions (freezing external temperatures, etc.). These lines experience a variation in temperature from the process vessel. A temperature gradient from the vessel operating temperature to the D/P Cell (potentially ambient) will occur over the length of these impulse lines (the amount of change (or gradient) will depend on the ambient conditions), resulting in changes in fluid density and hence specific gravity that cannot be compensated for, because they are variable, both with distance and ambient conditions. This non-stable fluid density (specific gravity) is a source of errors in DP cell level detector systems. Total fluid density must be stable in the impulse lines if DP readings are to be accurate. For a particular given constant ambient environment, the needed adjustment for specific gravity can be accounted for, for instance, in a calibration sequence. However, when conditions change, (e.g. the external environment changes or the in-tank conditions change) the calibrated factor will not be correct, resulting in erroneous level readings within the tank.

Figure 6:
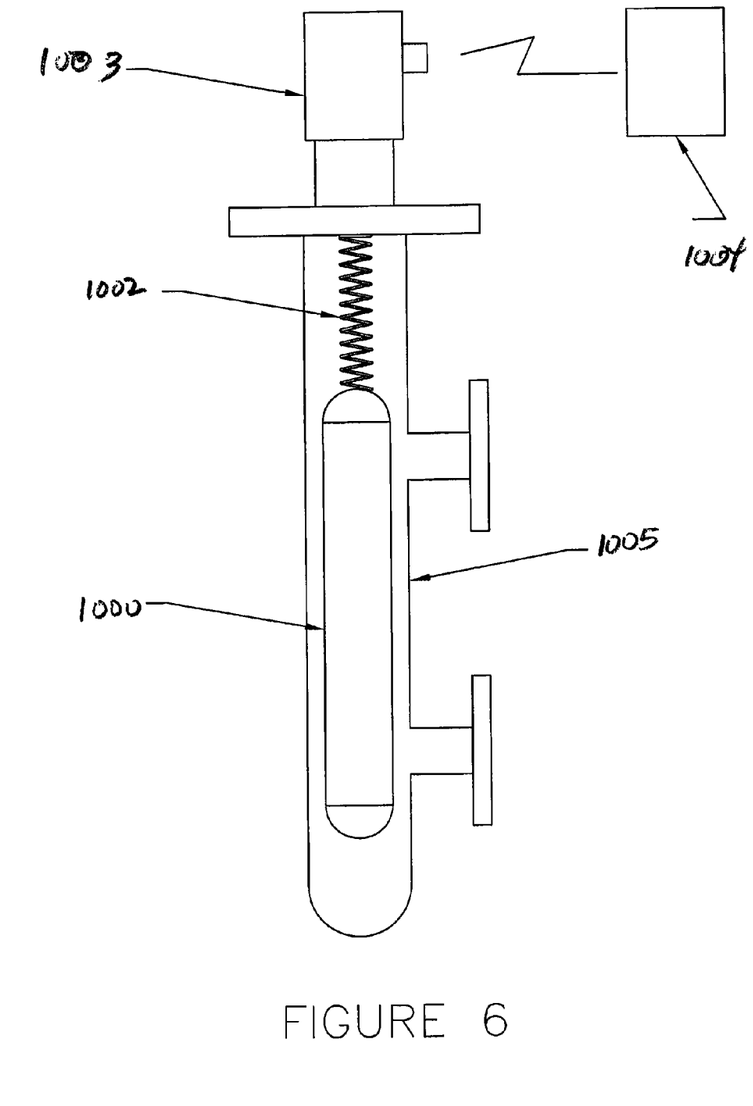
FIG. 6 is a depiction of a prior art displacer level measurement device

Another method used to determine level in a steam generator is to use a displacer located in an external well (see FIG. 6). A displacer is similar to a float but operates using a different principle. Floats are devices having a density lower than that of the liquid and operate on the buoyancy principle—as liquid level changes, a sealed container (the float) will move correspondingly. Displacers work on Archimedes Principle— when a body is immersed in a fluid it loses weight equal to that of the fluid displaced. By detection of the apparent weight of the immersed portion of the displacer, a level measurement can be inferred. Displacers are generally bodies having a specific gravity greater than that of the process fluid, and a displacer 1000 is generally suspended from a torque arm or a spring. Its apparent weight causes an angular displacement of the torque tube (a torsion spring, a frictionless pressure seal) or compression or expansion of the spring 1002. These displacements are linearly proportional to the displacer's weight and are easily measured. The displacer measurement will be transmitted by a transmitter 1003 to a remote location 1004.

Displacers are also affected by changes in product density as the displacement of the body (its weight loss) is equal to the weight of the fluid displaced. If the specific gravity changes, then the weight of the displaced material changes, thus changing the calibration. As displacers are located in external wells 1005, they have the same issues as DP cells and external float systems.

One problem with these prior art level measurement technologies is the inability to replicate internal vessel conditions externally from the vessel with non-varying accuracy. While the effects of internal specific gravity changes can be corrected and compensated for, temperature gradients in external float system chambers, a displacer chambers or differential pressure impulse lines cannot. Therefore, level measurement errors occur, many times going unnoticed and producing undesired results for long periods of time. Process tanks where ambient temperatures differ from the process temperatures by at least 50° C. have similar problems with level detection as are present in flashing process tanks.

SUMMARY OF THE INVENTION

The invention is a process tank containing a direct level magnetostrictive measurement system disposed directly in the tank, where the level system preferably communicates to a remote location. One embodiment of the invention embodies an internal float well guide or chamber, which while exactly replicating the actual vessel's internal conditions (pressure and temperature), also prevents the float from being affected by turbulence from a two phase condition (boiling or flashing) inside the vessel. The float well blocks the rising bubbles from entering the float chamber, allowing only liquid to enter, thus replicating the exact hydrostatic head of the two phase fluid internal to the vessel. Since heat is not added in the internal portion of the chamber, flashing or boiling can not occur internally in the float well, and the float has a relatively undisturbed environment, producing a very steady level measurement. The tank may be a flashing process tank, or a process tank (not necessarily flashing) where the internal tank process temperature varies more than 50° C. from the ambient external tank temperature.

DETAILED DESCRIPTION OF THE PREFERRED EMBODIMENT

Figure 2:
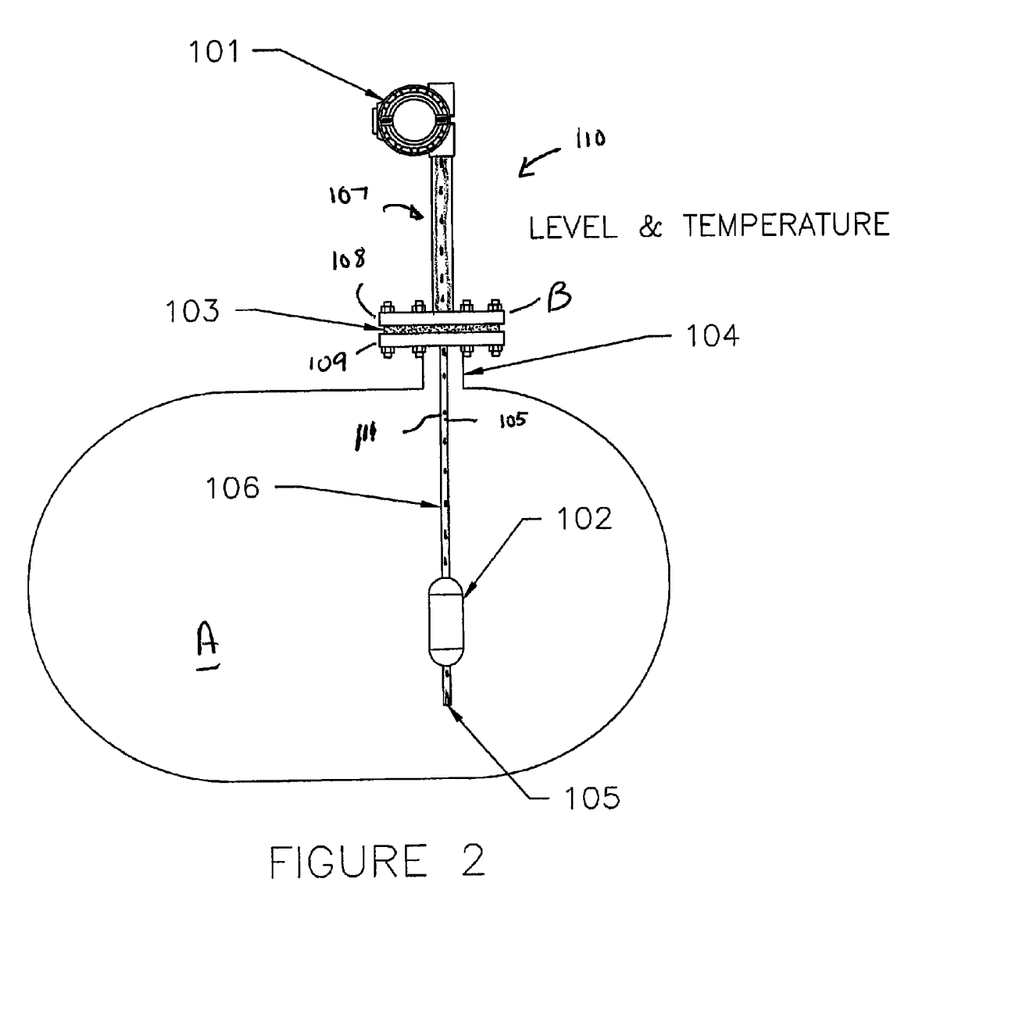
FIG. 2 is a depiction of one embodiment of a pressure tank having a direct level measurement system.

FIG. 2 is a schematic of a flashing process tank with a direct level measurement device installed therein. Not shown on any of the drawings is the direct read visual indicator (sightglass), which is required by code in a boiler application. Tank A has a level detection system 110 with the sensors contained within the tank interior, and not in an external chamber. The level sensor system 110 requires a single flanged area 103 on the tank, as the system 110 combines a level sensor with a temperature probe 105 in a single probe. The level detection system 110 includes a magnetostrictive level sensor that uses a float 102 with internal magnet(s) that interacts with a magnetostrictive wire 111 contained in the guide well or sensing tube 106. The guide well 106 is a sealed tube, and hence the interior of the tube (including the wire 111) is not exposed to the tank process liquid. Attachment of the sensor to the flange joint will be discussed separately.

The operations of a magnetostrictive level sensors are well known in the art. The guide well 106 contains a wire 111, which is pulsed at fixed time intervals (in many instances, the wire may be encased in a separate tube, in which event the guide well would contain a sensor tube with the wire within the sensor tube). The interaction of the current pulse with the magnetic field created by the magnet(s) in the float causes a torsional stress wave to be induced in the wire 111. This torsion wave propagates along the wire at a known velocity, starting from the position of the magnetic float. A piezo-magnetic sensing element located in the transmitter detects and converts the received mechanical torsion into an electrical return pulse. Sensor electronics measures the elapsed time between the start and return pulses, which is proportional to the level being measured. Sensor electronics includes the piezo-magnetic sensing element, the current pulsing equipment, the return pulse detection equipment and the various electronic components used to time the pulses, but as used here, does not include the wire 111.

The float 102 is generally of stainless steel construction, or some other material inert to the environmental conditions and material within the tank. The float 102 has a center bore and is slidable on the guide well 106, floating or moving with the height or level of a liquid in the flashing process tank. For high pressure environments, the float may be pressurized to resist collapse (for instance, pressurized to 600 psi using helium as a pressurizing fluid). A temperature probe 105 is contained in the guide well 106, preferably located near the bottom of the guide well 106. Temperature measurements are used primarily for specific gravity adjustments, later described. Fluid process temperature may be measured elsewhere as desired.

The guide well 106 is sealed from the tank process environment and must be sufficiently rigid to resist bending in the tank. The guide well 106 extends through the flange joint into the tank. The guide well 106 may be coupled to the instrument flange body 108 by a compression fitting, weld or other suitable sealing fitting. In this case, the instrument flange body 108 may be a cover plate with an opening (the "instrument opening") to accommodate the guide well penetration. Alternatively, the guide well may have an integrated flange that couples directly to the tank flange 109 or the instrument flange body 108 (using suitable sealing gaskets). In this instance, a separate sensor tube within the guide well 106 is preferred to allow removal of the sensor without removal of the guide well 106. The sensor and/or guide well terminates in a transmitter head 201. The transmitter head may be decoupled directly from the guide well 203, or the guide well may be broken in two portions at a joint 230 above the instrument flange body plate 202 (such as with a compression coupling) or stop at the joint 230 with the sensor tube extending above the joint 230.

One suitable level detection system is the AT100 level detection system available from K-Tek Corp in Prairieville, La. The electronics and piezoelectric crystal for the magnetostrictive system are generally contained in the level sensor transmitter head 101. The transmitter head is located above the top instrument flange body 108 via pipe or conduit 107. Pipe or conduit 107 extending above the instrument flange body couples the transmitter head 101 to the tank. This pipe 107 may be coupled to the guide well 106, such as with a flange fitting, threaded fitting, compression fitting, etc, may be a separate pipe or conduit fixed to the instrument flange body, or may simply be the guide well itself 106 (not preferred). The level sensor is powered by battery or by power from a source external to the detector, generally connected through the transmitter head 101.

The location of the magnet(s) with respect to the wire determines where the torsional signal will be generated in the wire, and hence, the magnet location with respect to the float liquid line should be known with precision. The location of the magnets with respect to the liquid level of the float will depend on the buoyancy of the float, which in turn depends on the specific gravity of the fluid in which it floats. The various "float responses" (i.e. the location of the "liquid line" on a particular float body with respect to a given fluid specific gravity) can be predetermined, for instance, based on lab measurements. Hence, if the specific gravity of the fluid is known (i.e. determined from the known fluid type and the measured fluid temperature) the location of the magnets in the float with respect to the "liquid line" can be determined (generally, using a stored lookup table in a stored database), thereby providing for the calculation of precise fluid levels. Using a measured temperature, adjustments to the specific gravity can be made using known specific gravity variations of the fluid with temperature.

The measured or calculated level measurements (measured in time as a $\Delta t$, or as a calculated distance, $\Delta t$*propagation velocity) can be adjusted to account for float liquid level variations (i.e. the float response) resulting from variations in the process specific gravity. These adjustments may be calculated at the sensor itself if a processor with the stored parameters (float response, specific gravity versus temperature data) are maintained in the detection system, such as by using a processor and memory located in the transmitter head. Calculated and or raw measurements may be transmitted to a remote location via wireless or wired communication from the transmitter head (wireless RF communication is preferred). Calculated or raw levels, or both, may be optionally displayed on the transmitter head 101 through a display means. Alternatively, the calculated and/or raw data (such as, temperature; $\Delta t$, calculated level, $\Delta t$*propagation velocity, etc) may be transmitted to the remote control room where the level may be calculated and/or monitored.

One disadvantage of this particular embodiment is the float. Stainless floats with center bores are difficult to build, and are heavier than a float without a bore. The center bore has to be large enough to accommodate a rigid guide tube 106 enclosing the magnetostrictive wire 111. Consequently, the float body will generally have to be larger diameter or longer length to create the needed buoyancy. Center bored floats, having additional seams, are more prone to higher failures than a non-center-bored float. Additionally, the float is directly exposed to the boiling environment in the tank interior, and measured level can hence fluctuate; the float bore may also become clogged with impurities in the fluid, restricting the movement of the float, requiring the tank process to be shut down to allow the level detector to be removed for cleaning.

Figure 3:
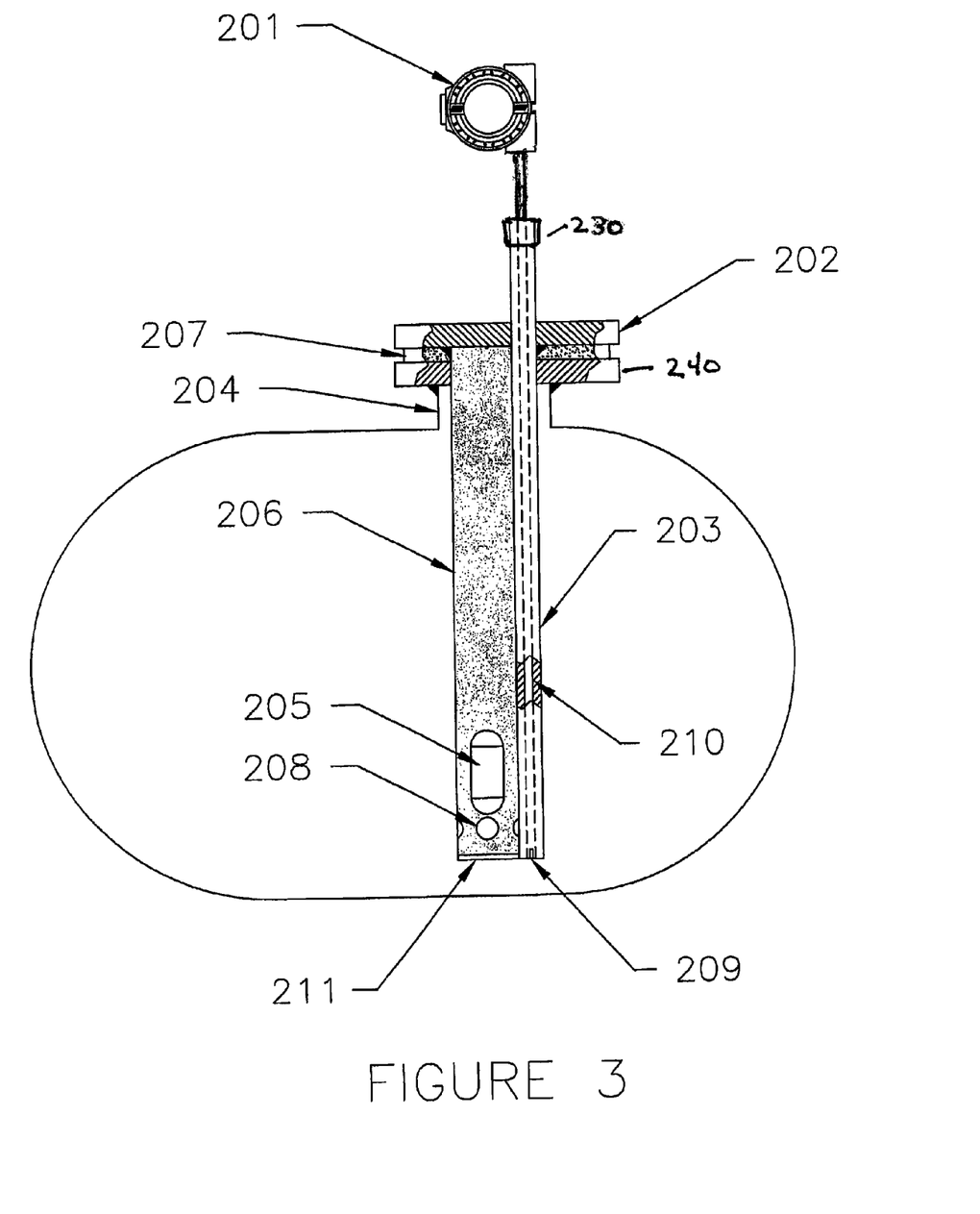
FIG. 3 depicts the simplest embodiment of a pressure tank having a direct level measurement system.

An alternative magnetostrictive level direct level detector is depicted in FIG. 3. Shown in FIG. 3 is the magnetostrictive system where the float 205 is retained in a pipe or float well 206 (sometimes referred to as a "stilling well"). The float well 206 may be fixedly and non-removably attached to the upper instrument flange body plate 202 (such as by welding) and does not need to penetrate the instrument flange body plate 202. Alternatively, the float well 206 may be coupled to the tank flange 240 by a flange on the float well 206 (not shown—in this event, the guide well 203 will generally be positioned within the float well 206). The guide well 203 containing the magnetostrictive wire (or a separate sensor tube containing the wire) is shown adjacent to the float well 206, and may be welded to the float well 206 or the flange 202 or simply positioned adjacent to the float well.

The guide well 203 may also be internal to the float well 206 or manufactured as a part of the well. As shown, the guide well 203 penetrates the instrument flange body plate 202 and extends above the flange 202 to provide access to the transmitter head 201. Contained in the guide well 203 is the magnetostrictive active wire 210, and preferably, a temperature sensor 209 (electrically connected to the sensor electronics in the transmitter head). It is not necessary for the float well 206 to penetrate the instrument flange body plate 202.

The interior of the guide well 203 is preferably sealed from the tank environment, and consequently, not exposed to the tank's internal pressures. In this embodiment, the electronics, wire and temperature probe (generally encased in a sensor tube) may be removed from the guide well 203 for servicing, without shutting down the tank process. The sensor tube 210 may be secured to the guide well 203 via compression fitting or other coupling means. To assist in removal of the electronics from the guide well 203, it is preferred that the guide well 203 have a manually operated release valve above the instrument flange body plate 202 to allow an operator to bleed excess pressure that may be present in the guide well 203 in the event that the seal integrity of the guide well interior fails.

Float well 206 has a float 205 slidable in the interior of the well 206. The float well 206 has openings 208 in the side of the well near the distal end of the well, and the distal or bottom end of the float well 206 is covered with a cap 211. The cap 211 retains the float 205 in the interior of the well 206, and keeps contaminates and vapor bubbles from entering the interior of the well 206 from the bottom. Consequently, the environment within the float well 206 is less turbulent, providing for more stable level measurements. The float well 206 may have openings at the top of the guide well 206 (in the vapor portion of the tank) to vent any vapors that do enter the float well (not shown), allowing free liquid flow in and out of the float well. The float 205 contains magnets, generally in the float interior, to interact with the magnetostrictive wire. Hence, the magnetostrictive wire in the guide tube must be within sensing distance of the magnet(s) in the float 205 for a particular level measurement. "Within sensing distance" means the magnet(s) must be sufficiently close to the wire to create a torsional wave that can be detected by the sensor electronics.

Figure 7:
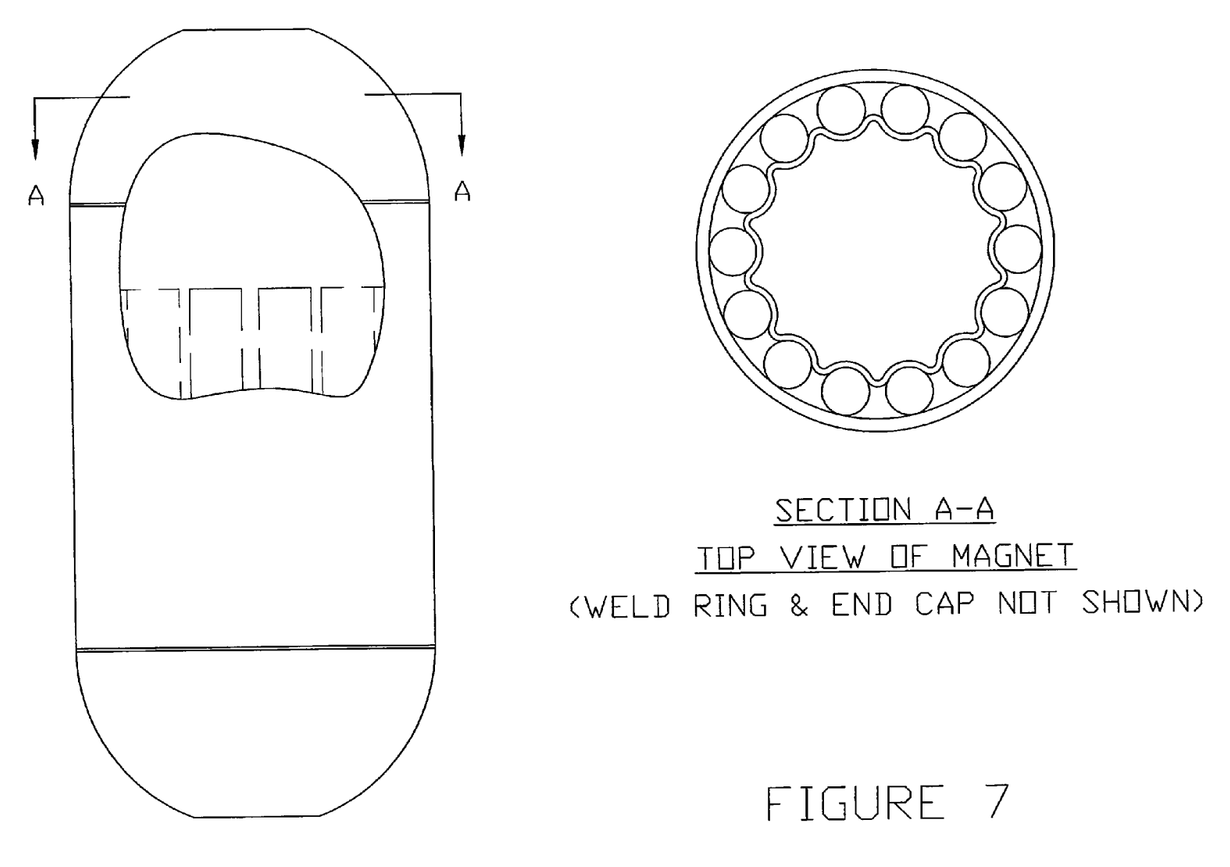
FIG. 7 shows a top cross-section through a float depicting preferred magnet orientation for the embodiment of FIG. 4.

The existing K-Tek AT100 magnetostrictive device can be modified for this design by attaching a float well to the guide well of the AT100 device, and using a suitable float 205 in the float well 206 (a float without a center bore can be utilized in this embodiment), and removing the float from the AT100 sensor probe. Similarly, the K-Tek AT200 magnetostrictive device could also be employed. A suitable temperature probe 209 can be incorporated in the sensor tube 210, or the guide well 203 (not preferable). In this embodiment, the float may rotate in the float well 206, and the magnets in the float must be configured to accommodate such float rotation. FIG. 7 shows a top cross-section through a float, depicting internal magnet placement. As shown, the float has a series of rod magnets 500 located around the outer periphery of the float, where the magnets are vertically orientated (a annulus magnet may also be used). Vertical magnet orientation is preferred, as opposed to radially orientated magnets, such as may be used with the center bored float magnetostrictive system of FIG. 2. In this fashion, the magnetic field external to the float body 205 at a given radial distance from the center of the float is substantially the same, and not dependent on float orientation. While a larger tank flange opening is required for this embodiment than that of FIG. 2, to accommodate the float well, the float does not need a center bore, and consequently, the float 205 can be a smaller in cross section, and more robust.

Figure 4:
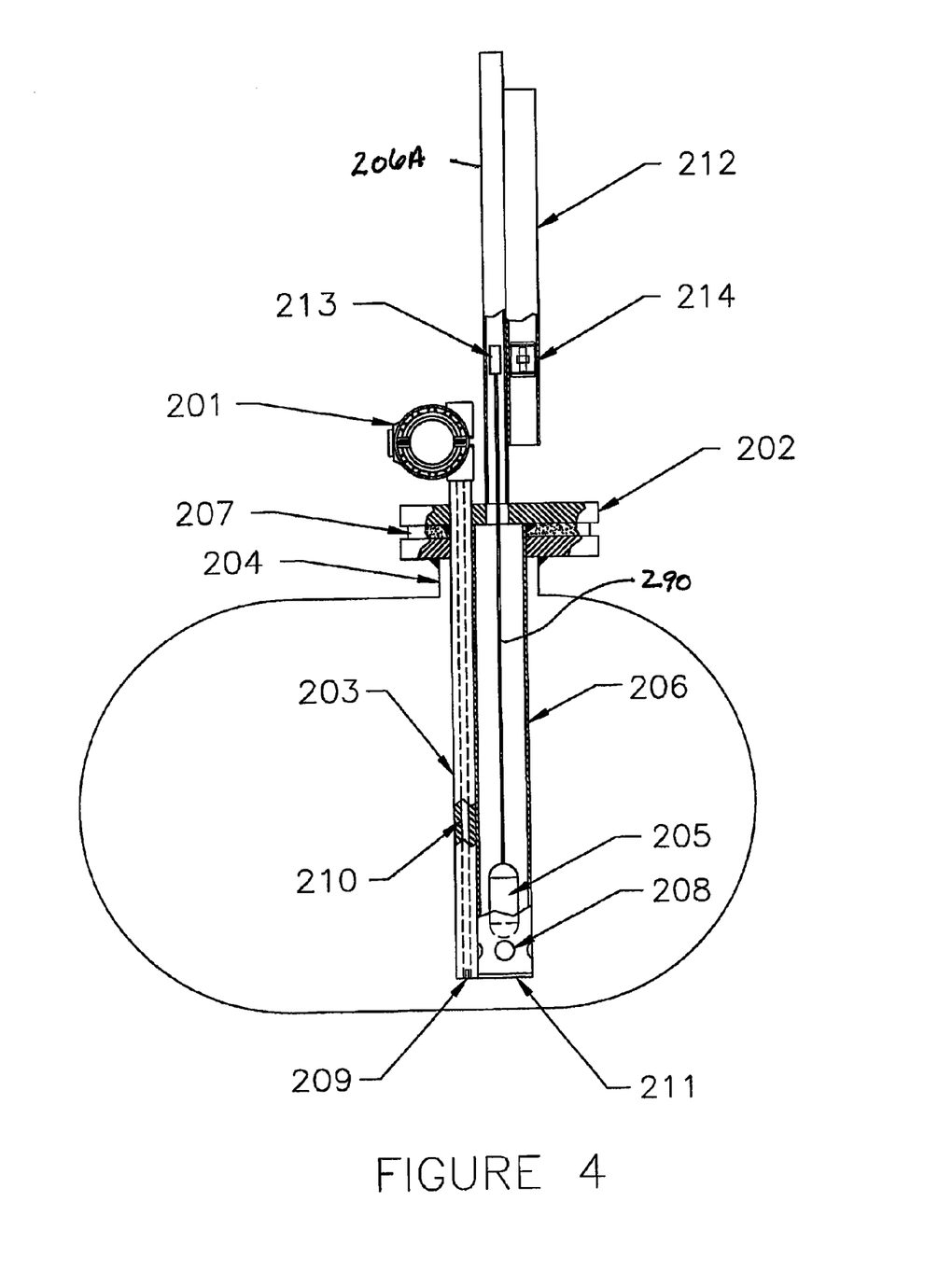
FIG. 4 is a cross section of another embodiment of the system of FIG. 3 incorporating a visual level indicator.

Another embodiment of a direct measurement system is shown in FIG. 4. This embodiment is a modification of the design in FIG. 3, and includes the magnetostrictive wire in the tank interior that interacts with a float magnet, where the float is positioned in the tank interior. In this particular embodiment, a float well system is used, containing the float well 206 in the tank interior, and a small diameter non-magnetic extension 206A of the float well, extending above the instrument flange body plate 202. This extension 206A may be a unitary extension or a separate chamber that couples to flanged area (such as with a separate flange). The extension 206A is preferably constructed to withstand the same temperatures and pressures as the tank itself, but as the float 205 itself does not travel in the extension 206A, the extension 206A may be of smaller diameter than that of the float well 206 interior to the tank.

Also used is a float system, including the float 205 and a rod or tube 290 coupled to the float 205. As shown, rod 206 is a hollow lightweight stainless rod extending above the float 205. Rod 206 travels in the interior of the float well 206 and extends into the extension 206A. Positioned at the distal end (the end distant from the float) of the rod 290 is a magnet 213. Magnet 213 interfaces with a visual indicator 212 located adjacent to the extension well 206A. Visual indicator is responsive to the location of the magnet 213 and provides a visible location of the magnet location. One such visual indicator is the K-Tek KM26 Magnetic Level Gauge. Other visible means 214 for responding to the magnet may be used, such as a magnet slidable in chamber 212 that is coupled to magnet 213. The chamber 212 would have a sight glass to view the position of the magnet in chamber 214, with suitable level markings in the chamber sidewall. Another visual indicator is a magnetic flag assembly or other means responsive to the magnet 213. A magnetic flag assembly is made up of a series of hi-colored flags. As the float 213 rises and falls with the liquid level in the gauge housing chamber, magnets embedded in each flag reacts to the magnetic flux of the magnet 213. This magnetic interaction causes each flag to rotate 180 degrees. The flags below the magnetic flux of the float will flip to show one color, for instance red, while those flags above the float level remain "unflipped" and display a second color, for instance black. Additionally magnetically sensitive switches may be positioned along the side of the indicator, providing discrete alarm or switch points for additional control (not shown).

This visual indicator from an internal float chamber will provide a direct level measurement, but does not automatically account for the float response due to variations is process fluid specific gravity. However, the transmitted or transmitter displayed level may include specific gravity corrections. The "float response" used in adjusting for the fluid specific gravity should account for the buoyancy of the entire float system—the float 205, rod 290 and magnet 213.

Figure 5:
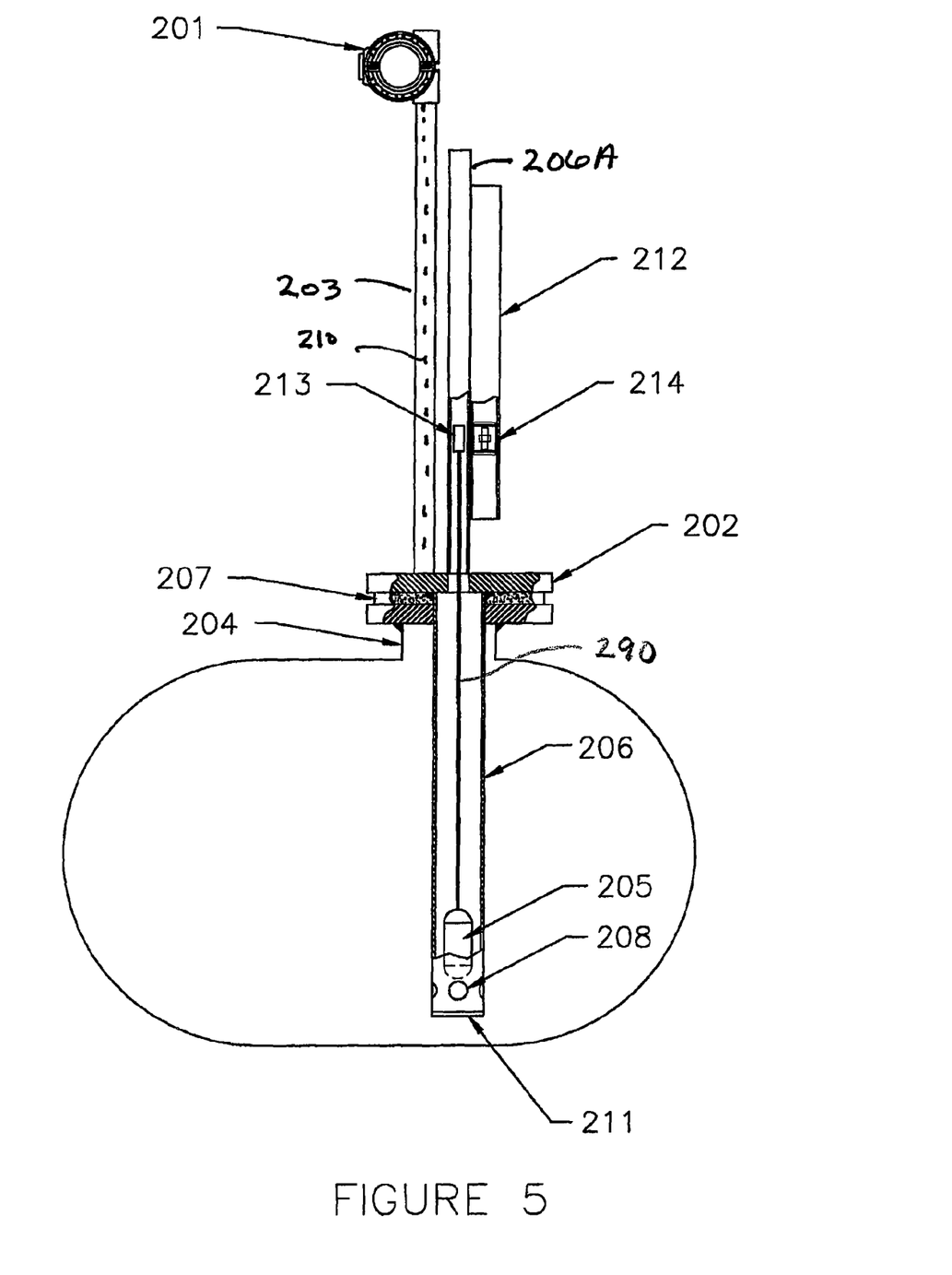
FIG. 5 is cross section through an variation of the level measurement apparatus of FIG. 4.

A variation of the design of FIG. 4 is shown in FIG. 5. In this embodiment, the magnetostrictive sensor is used, but the magnetostrictive wire is not in the interior of the tank, but exterior to the tank. The guide well 203 extends above the tank, but not into the tank A. The magnetostrictive wire 210 located in the guide well 203 is now responsive to the magnet 213 located on the distal end of the rod 290, and no magnets are required in the body of the float 205 itself. The magnet 213 will thus drive both the visual magnetic indicator 214 (if present) and interact in the magnetostrictive wire 210 and required electronics positioned in the transmitter head 201. As before, the transmitter head may contain communications means (either wired or wireless) to transmit data to a remote control area or station. One disadvantage of this design is that a temperature probe has to be accommodated elsewhere, for instance, in the float well 206, or another internal location in the tank, or dispensed with entirely (not recommended).

The process described uses a flanged opening. As mentioned above, the process connection into the interior of the tank does not have to be a flange opening, and can include a nipple opening, where the sensor is coupled to the nipple.

The invention claimed is:

1. The combination of a flashing process tank with a magnetostrictive level detector, wherein said magnetostrictive level detector includes a sensor wire and sensor electronics, said flashing tank having an interior and an exterior, and includes a first opening into said interior, said first opening terminating in a tank flange, an instrument flange body removably and sealingly coupled to said tank flange, said coupled instrument flange body and tank flange defining a flanged joint, said instrument flange body in a covering relationship with said first opening in said flashing tank and having an instrument opening therein, a float well attached to said instrument flange body but not extending through said instrument flange body, said float well having a sidewall and a closed bottom, said float well extending into said tank interior, said float well having openings in said sidewall, a float disposed in said float well, and movable in said float well, in response to the level of said liquid in said flashing tank, said float having at least one magnet, a magnetostrictive wire positioned in a guide well, said guide well being sealingly mounted to said flanged joint through said instrument opening, and said magnetostrictive wire not extending through said float but being within sensing distance of said magnet in said float, said magnetostrictive wire contained in said guide well in the interior of said flashing tank, said guide well being sealed from the environment in the interior of said flashing tank.

2. The combination of claim 1 wherein said guide well is positioned adjacent to said float well.

3. The combination of claim 1 wherein said guide well is positioned interior to said float well.

4. The combination of claim 1 wherein said guide well is removably coupled to said instrument flange body.

5. The combination of claim 1 wherein said flashing tank is a boiler.

6. The combination of claim 1 further having a temperature probe, said temperature probe being positioned in said guidewell.

7. The combination of claim 1 further having a transmitter head coupled to said instrument flange body, said magnetostrictive wire terminating in said transmitter head.

8. The combination of a flashing tank with a magnetostrictive level detector, wherein said magnetostrictive level detector includes a magnetostrictive wire and sensor electronics and a transmitter head positioned external to said tank, said flashing tank having an interior and an exterior and a fluid undergoing flashing in said interior and having both liquid and gas phases present in said tank interior, and includes a first opening into said interior, said first opening terminating in a tank flange,
an instrument flange body removably and sealingly attached to said tank flange creating a flanged joint, a sensor well sealingly extending through said first opening and said flanged joint, said magnetostrictive wire positioned in an interior of said sensor well, said sensor well interior sealingly isolated from said interior of said flashing tank; a float positioned in said tank, said float having an opening there through, said sensor well passing through said float opening, said float slidable on said sensor well in response to the level of a liquid in said flashing tank, said float having at least one magnet within sensing distance of said magnetostrictive wire,
and said magnetostrictive wire terminating in said transmitter head.

9. The combination of a flashing tank with a magnetostrictive level detector, wherein said magnetostrictive level detector includes a magnetostrictive wire and sensor electronics and a transmitter head, said magnetostrictive wire terminating in said transmitter head, said flashing tank having an interior and an exterior and a fluid undergoing flashing in said interior and having both liquid and gas phases present in said tank interior, and includes a first opening into said interior, said first opening terminating with a tank flange,
an instrument flange body removably and sealingly coupled to said tank flange, said instrument flange body in a covering relationship with said first opening in said flashing tank,
a float well system including a float well and a float well extension, said float well coupled to said tank flange and extending into said tank interior, said float well extension penetrating said instrument flange body and extending exterior to said tank, said float well having a sidewall with a closed bottom end and openings in said sidewall, a float system disposed in said float well system, said float system including a float and a rod fixedly attached to said float, said magnetostrictive wire not extending through said float, said float and said rod movable in said float well system with the level of a liquid in said flashing tank, said rod having a distal end that extends through said instrument flange body into said float well extension, said float system having a first magnet, said first magnet located within sensing distance of said magnetostrictive wire.

10. The combination of claim 9 further having a visual indicator responsive to the location of said first magnet, said visual indicator located external to said tank.

11. The combination of claim 10 wherein said visual indicator comprises a magnetic flag assembly.

12. The combination of claim 9 wherein said distal end of said rod includes a second magnet, said combination further having a visual indicator responsive to the location of said second magnet, said visual indicator located external to said tank.

13. A method of measuring level in a process tank, where the process tank an interior and an exterior, and a liquid process fluid disposed in said tank interior, said process fluid having a temperature more than 50° C. different from the ambient temperature external to the tank, said tank having a first opening extending into the tank interior, a sensor tube containing a magnetostrictive level detector sensor wire, said sensor tube sealing positioned through said first opening and extending into the interior of the tank, a float well having a sidewall and a closed bottom, said float well extending into said tank interior, said float well having openings in said sidewall, a float containing a magnet disposed in the interior of the tank within sensing distance of said magnetostrictive sensor wire, the method comprising the steps of
(a) pulsing said magnetostrictive wire with a first pulse; (b) detecting a return pulse on said magnetostrictive wire; (c) determining a process fluid level based upon the difference in time between said first pulse and said return pulse.

14. The method of claim 13, wherein process tank further includes a temperature probe, said temperature probe positioned in the interior of the tank, and the method further includes the steps of (d) receiving a temperature reading from the temperature probe, and (e) adjusting said determined process fluid level based upon said received temperature.

15. A method of measuring level in a process tank, where the process tank an interior and an exterior, and a process fluid disposed in said tank interior, said process fluid undergoing flashing in said tank and having both liquid and gas phases present in said tank interior, said tank having a first opening extending into the tank interior, a sensor tube containing magnetostrictive level detector sensor wire, said sensor tube sealing positioned through said first opening and extending into the interior of the tank, a float well float containing a magnet disposed in the interior of the tank within sensing distance of said magnetostrictive sensor wire, but said magnetostrictive wire not extending through said float, the method comprising the steps of
(a) pulsing said magnetostrictive wire with a first pulse; (b) detecting a return pulse on said magnetostrictive wire; (c) determining a process fluid liquid level based upon the difference in time between said first pulse and said return pulse.

* * * * *